(12) United States Patent
Jiang et al.

(10) Patent No.: US 11,876,773 B2
(45) Date of Patent: Jan. 16, 2024

(54) LEARNING METHOD OF A CORRESPONDENCE RELATIONSHIP BETWEEN AN IP ADDRESS AND A MAC ADDRESS AND NODE DEVICE

(71) Applicant: ZTE Corporation, Shenzhen (CN)

(72) Inventors: Haiming Jiang, Shenzhen (CN); Mingjun Gu, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/788,403

(22) PCT Filed: Dec. 1, 2020

(86) PCT No.: PCT/CN2020/133141
§ 371 (c)(1),
(2) Date: Jun. 23, 2022

(87) PCT Pub. No.: WO2021/129329
PCT Pub. Date: Jul. 1, 2021

(65) Prior Publication Data
US 2023/0021517 A1 Jan. 26, 2023

(30) Foreign Application Priority Data
Dec. 24, 2019 (CN) .......................... 201911348106.X

(51) Int. Cl.
*H04L 61/103* (2022.01)
(52) U.S. Cl.
CPC .................. *H04L 61/103* (2013.01)
(58) Field of Classification Search
CPC ............... H04L 61/103; H04L 45/54
(Continued)

(56) References Cited

U.S. PATENT DOCUMENTS

2006/0209818 A1  9/2006  Purser
2016/0149725 A1  5/2016  Yang

FOREIGN PATENT DOCUMENTS

CN    101123614 A    2/2008
CN    101123614 A1   2/2008
(Continued)

OTHER PUBLICATIONS

European Search Report for corresponding application EP20906174; dated Dec. 14, 2022.
(Continued)

*Primary Examiner* — Hee Soo Kim
(74) *Attorney, Agent, or Firm* — CANTOR COLBURN LLP

(57) ABSTRACT

Provided is an Address Resolution Protocol (ARP) learning method, which includes: determining, by a forwarding chip, an IP address of a target device; when an MAC address corresponding to the IP address of the target device is not stored in an ARP forwarding table, generating and broadcasting, by the forwarding chip, an ARP request message, wherein the ARP request message includes the IP address of the target device; receiving, by the forwarding chip, an ARP response message fed back by the target device, wherein the ARP response message includes an MAC address of the target device; and writing, by the forwarding chip, the IP address of the target device and the MAC address corresponding to the IP address into the ARP forwarding table. The present disclosure also provides a node device and a computer-readable medium.

20 Claims, 7 Drawing Sheets

(58) Field of Classification Search
USPC .......................................................... 709/245
See application file for complete search history.

(56) References Cited

FOREIGN PATENT DOCUMENTS

| | | | | | |
|---|---|---|---|---|---|
| CN | 101179566 | A | | 5/2008 | |
| CN | 101237415 | A | * | 8/2008 | ........... H04L 61/103 |
| CN | 103248720 | A | | 8/2013 | |
| CN | 105939266 | A | * | 9/2016 | ............. H04L 45/60 |
| CN | 105939397 | A | * | 9/2016 | ............. H04L 45/74 |
| CN | 106209644 | A | * | 12/2016 | ............. H04L 45/54 |
| CN | 106209644 | A | | 12/2016 | |
| CN | 108134855 | A | | 6/2018 | |
| CN | 109922442 | A | * | 6/2019 | |
| CN | 109922442 | A | | 6/2019 | |
| WO | 2015014316 | A1 | | 2/2015 | |

OTHER PUBLICATIONS

International Search Report for corresponding application PCT/CN2020/133141 filed Dec. 1, 2020, dated Mar. 2, 2021.

\* cited by examiner

LEARNING METHOD OF A CORRESPONDENCE RELATIONSHIP BETWEEN AN IP ADDRESS AND A MAC ADDRESS AND NODE DEVICE

CROSS-REFERENCE TO RELATED APPLICATION

This disclosure is based upon and claims priority to Chinese Patent Disclosure No. 201911348106.X, filed on Dec. 24, 2019, the entire contents of which are incorporated herein by reference.

TECHNICAL FIELD

Embodiments of the present disclosure relate to the technical field of computers, in particular to an Address Resolution Protocol (ARP) learning method, a node device and a computer-readable medium.

BACKGROUND

In the construction of a 5G network, a bearer network needs to provide a transmission channel with an ultra-large bandwidth and an ultra-low delay. Moreover, the use of a fast forwarding technology for bearer network services reduces the complexity of network connection, so that service paths are easier to maintain. Flexible scheduling of a 5G network under massive connection can be supported.

A bearer network needs to use an Address Resolution Protocol (ARP) when forwarding a data message. The ARP stores a correspondence relationship between an Internet Protocol (IP) address for inter-network connection and a Media Access Control (MAC) address. After receiving a data message, an upstream device queries, according to a destination IP address contained in the data message, the ARP for an MAC address corresponding to the destination IP address, thus forwarding, according to the MAC address, the data message to a downstream device corresponding to the MAC address.

In practical applications, a correspondence relationship between the IP address and the MAC address stored in the ARP needs to be acquired through learning. However, an existing ARP learning method has a low rate, which causes that the ARP cannot acquire the correspondence relationship between the IP address and the MAC address in time when a bearer network needs to carry out fast forwarding, thus resulting in a problem of easy loss of a data packet and a failure in meeting a 5G bearing requirement.

SUMMARY

Embodiments of the present disclosure relate to an ARP learning method, a node device and a computer-readable medium.

An embodiment of the present disclosure provides an ARP learning method, which includes: determining, by a forwarding chip, an IP address of a target device; when an MAC address corresponding to the IP address of the target device is not stored in an ARP forwarding table, generating and broadcasting, by the forwarding chip, an ARP request message, wherein the ARP request message includes the IP address of the target device; receiving, by the forwarding chip, an ARP response message fed back by the target device, wherein the ARP response message includes an MAC address of the target device; and writing, by the forwarding chip, the IP address of the target device and the MAC address corresponding to the IP address into the ARP forwarding table.

An embodiment of the present disclosure also provides another ARP learning method, which includes: receiving, by a forwarding chip, an ARP request message, wherein the ARP request message includes an IP address of a target device; when an IP address of a device to which the forwarding chip belongs is the IP address of the target device, generating, by the forwarding chip, an ARP response message, wherein the ARP response message includes an MAC address of the device to which the forwarding chip belongs; and feeding back, by the forwarding chip, the response message to a source sending device of the ARP request message.

An embodiment of the present disclosure also provides a forwarding chip, which stores a computer program. The computer program, when executed, causes the forwarding chip to implement the steps in the ARP learning method provided in the above-mentioned embodiment.

The present disclosure also provides a node device, which includes the Central Processing Unit (CPU) and the forwarding chip provided by the above-mentioned embodiment.

The present invention also provides a computer-readable medium, which stores a computer program. The computer program, when executed by a processor, implements the steps in the ARP learning method provided in the above-mentioned embodiment.

BRIEF DESCRIPTION OF THE DRAWINGS

The accompanying drawings are used to provide a further understanding of the present disclosure and constitute a part of this specification to explain the present disclosure together with the embodiments of the present disclosure, and do not constitute restrictions to the present disclosure. The above and other features and advantages will become more apparent to those skilled in the art by referring to the attached drawings to describe the detailed example embodiments. In the drawings.

DETAILED DESCRIPTION OF THE EMBODIMENTS

In order to make those skilled in the art better understand the technical solutions of the present invention, an ARP learning method, a forwarding chip, a node device, and a computer-readable medium provided by the present invention are described in detail below in combination with the accompanying drawings.

Example embodiments are described more fully hereinafter with reference to the accompanying drawings, but which may be embodied in different forms and should not be construed as being limited to the embodiments set forth herein. Rather, these embodiments are provided so that the present disclosure will be thorough and complete, and will fully convey the scope of the present disclosure to those skilled in the art.

The terms used herein are used to describe particular embodiments only and are not intended to limit the present disclosure. As used herein, the singular forms "a/an" and "the" are intended to include the plural form as well, unless the context clearly dictates otherwise. It should be further understood that the terms "include" and/or "consisting of . . . " used in this specification refer to the presence of the features, integers, steps, operations, elements and/or components, but does not exclude the presence or addition of one or more of other features, integers, steps, operations, elements, components and/or their combinations It should be understood that although the terms "first", "second", etc. may be used herein to describe various elements/instructions/requests, these elements/instructions/requests should not be limited by these terms. These terms are only used to distinguish one element/instruction/request from another element/instruction/request.

Unless otherwise defined, all terms (including technical and scientific terms) used herein have the same meaning as commonly understood by those of ordinary skill in the art. It will also be understood that terms such as those defined in commonly used dictionaries should be construed as having meanings consistent with their meanings in the backgrounds of the relevant art and the present disclosure, and will not be construed as having idealized or over-formal meanings, unless expressly so limited herein.

An ARP learning method provided by the present disclosure is used for perfecting an ARP in a node device. The node device includes a CPU and a forwarding chip. The following method of the present disclosure will be implemented on the basis of the forwarding chip in the node device.

Figure 1:
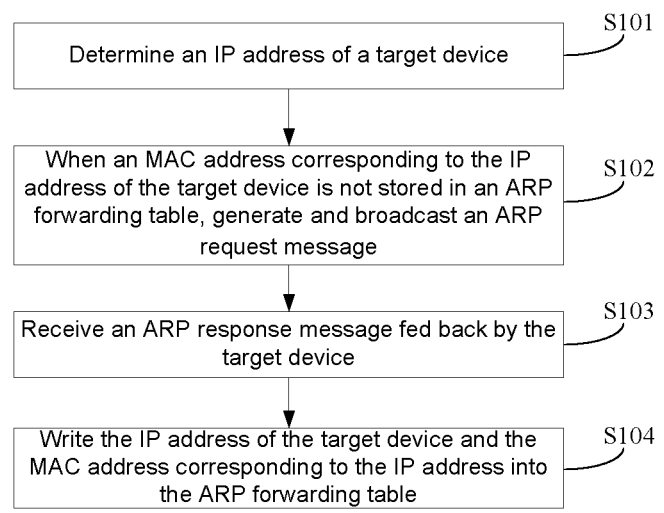
FIG. 1 is a flowchart of an ARP learning method provided in an embodiment of the present disclosure.

FIG. 1 is a flowchart of an ARP learning method provided in an embodiment of the present disclosure. As shown in FIG. 1, the method includes:

In step S101, a forwarding chip determines an IP address of a target device.

In the present embodiments, the target device refers to a device corresponding to a next-hop node to which the forwarding chip is going to forward a data message. The target device may be determined on the basis of any communication link acquisition method in the related art. For example, the target device may be determined by a current node device by querying a routing table. Or, a communication link is preset in a data message, and a current node device knows the target device directly from the data message.

In step S102, when an MAC address corresponding to the IP address of the target device is not stored in an ARP forwarding table, the forwarding chip generates and broadcasts an ARP request message.

After determining the IP address of the target device, the forwarding chip queries the ARP forwarding table according to the IP address of the target device, so as to determine whether an MAC address corresponding to the IP address of the target device is stored in the current ARP forwarding table. When it is determined that no MAC address corresponding to the IP address of the target device is stored in the current ARP forwarding table, it indicates that the ARP forwarding table needs to learn the IP address of the target device and the MAC address corresponding to the IP address. In the embodiment of the present disclosure, when the ARP forwarding table learns the addresses, the forwarding chip directly generates an ARP request message and broadcasts the an ARP request message. The ARP request message includes the IP address of the target device.

It should be noted that the ARP forwarding table can be set in the forwarding chip, or can be set outside the forwarding chip and can be directly invoked and changed by the forwarding chip. IP addresses of different node devices and MAC addresses corresponding to all the IP addresses are stored in the ARP forwarding table.

In step S103, the forwarding chip receives an ARP response message fed back by the target device.

After the forwarding chip broadcasts the ARP request message, each of forwarding chips of other node devices neighboring to the current node device in a network receives the ARP request message, and verifies whether its IP address matches the IP address of the target device that is contained in the ARP request message. When it is verified that the IP address matches the IP address of the target device that is contained in the ARP request message, the node device is determined as a target device. then the forwarding chip in the target device feeds back an ARP response message to the current node device. The ARP response message includes an MAC address the target device.

In step S104, the forwarding chip writes the IP address of the target device and the MAC address corresponding to the IP address into the ARP forwarding table.

After receiving the ARP response message, the forwarding chip of the current node device extracts the MAC address contained in the ARP response message, and writes the IP address of the target device and the MAC address corresponding to the IP address into the ARP forwarding table.

According to the ARP learning method provided by the embodiment of the present disclosure, when a node device needs to carry out ARP learning, the forwarding chip of the node device directly generates an ARP request message and broadcasts the ARP request message. In addition, after receiving an ARP response message, the forwarding chip directly writes the ARP forwarding table, without processing the ARP forwarding table by a CPU, thus avoiding being transmitted upward and downward by the CPU, so that the ARP learning rate is increased, and the probability of data packet loss is reduced. Therefore, the ARP learning method is more applicable to the requirement for 5G bearing.

In some embodiments, when the IP address of the target device and the MAC address corresponding to the IP address are stored in the ARP forwarding table, the forwarding chip sends the data message to the target device according to the MAC address corresponding to the IP address of the target device.

Figure 2:
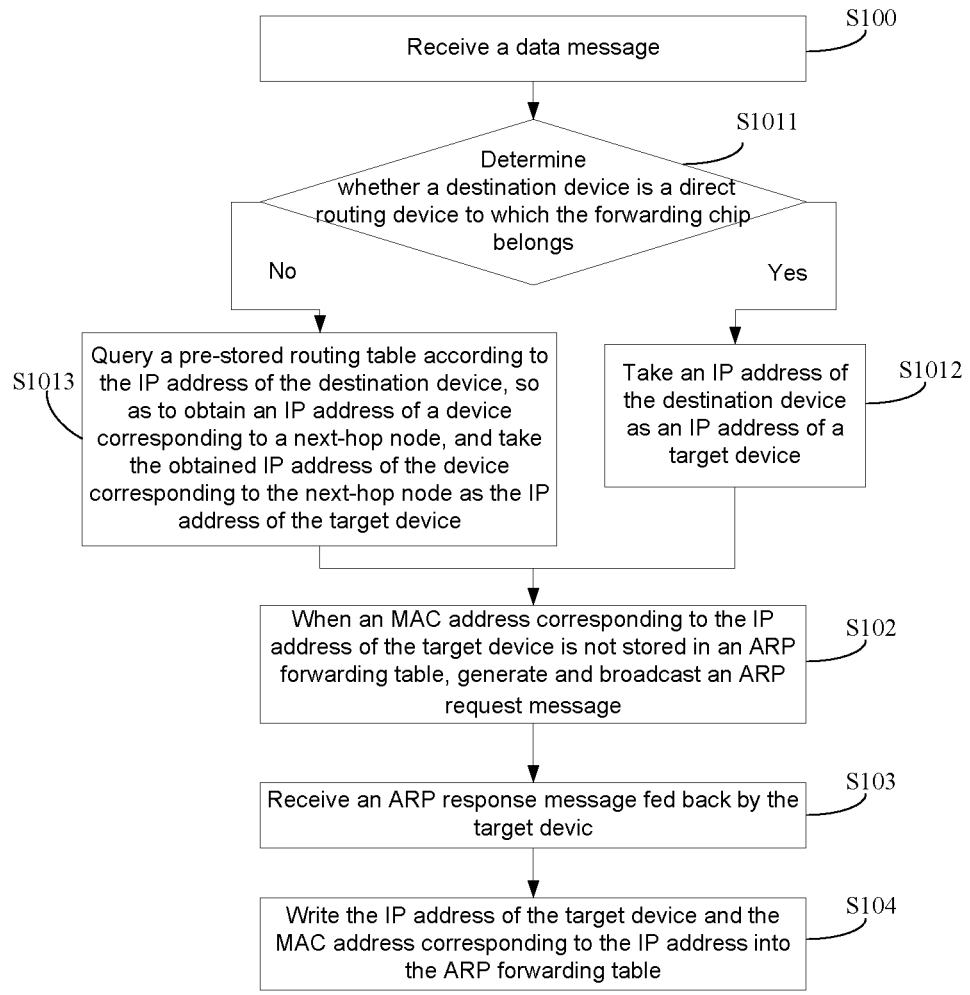
FIG. 2 is a flowchart of another ARP learning method provided in an embodiment of the present disclosure.

FIG. 2 is another ARP learning method provided by an embodiment of the present disclosure. As shown in FIG. 2, in some embodiments, before the step S101, the method also includes the following steps.

In step S100, a forwarding chip receives a data message.

When there is a data message needing to be forwarded, a forwarding chip of a node device receives the data message. The data message includes an IP address of a destination device. The destination device refers to an end device to which the data message is transmitted.

Correspondingly, the step S101 specifically includes:

In step S1011, it is determined whether the destination device is a direct routing device of the device to which the forwarding chip belongs.

When it is determined that the destination device is a direct routing device of the device to which the forwarding chip belongs, the following step S1012 is executed; and when it is determined that the destination device is not a direct routing device of the device to which the forwarding chip belongs, the following step S1013 is executed.

In step S1012, the forwarding chip takes the IP address of the destination device as an IP address of a target device.

In step S1013, the forwarding chip queries a pre-stored routing table according to the IP address of the destination device, so as to obtain an IP address of a device corresponding to a next-hop node, and takes the obtained IP address of the device corresponding to the next-hop node as the IP address of the target device.

Direct routing is a way that a router learns routing information and generates and maintains a routing table. Direct routing is discovered by a link layer protocol, and generally refers to a path to a network segment where an interface address of the router is located. The path information neither needs to be maintained by a network administrator, nor is calculated by the router through a certain algorithm. As long as this interface is active, the router will fill in a routing table with routing information leading to the network segment. Direct routing fails to enable the router to acquire routing information that is not directly connected to the router.

In the embodiment of the present disclosure, when determining the IP address of the target device, the forwarding chip first determines whether the destination device is a direct routing device of the device to which the forwarding chip belongs. When it is determined that the destination device is a direct routing device, it indicates that the destination device can directly carry out communication, and the step S1012 is then executed, so as to directly take the IP address of the destination device as the IP address of the target device. When it is determined that the destination device is not a direct routing device, it indicates that the destination device requires forwarding by other nodes, and the step S1013 is then executed, so as to query the routing table to obtain a device of a next-hop node; and the IP address of the obtained device corresponding to the next-hop node is taken as the IP address of the target device.

Figure 3:
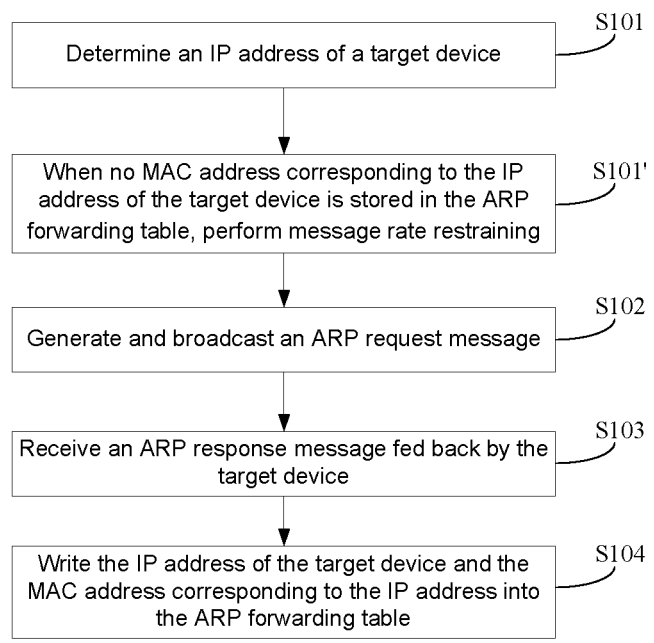
FIG. 3 is a flowchart of yet another ARP learning method provided in an embodiment of the present disclosure.

FIG. 3 is yet another ARP learning method provided in an embodiment of the present disclosure. As shown in FIG. 3, in this embodiment, before the step S102, the method also includes the following steps.

In step S101', the forwarding chip performs message rate restraining, so as to control a sending rate of an ARP request message.

In the embodiment of the present disclosure, before the forwarding chip generates and sends an ARP request message, the forwarding chip also performs message rate restraining. The message rate restraining is used for controlling the rate of the forwarding chip for sending an ARP request message to the outside, thus preventing an ARP attack to a downstream node device. How the forwarding chip specifically performs the message rate restraining can be performed based on any of the existing methods, which is not specifically limited in the embodiment of the present disclosure.

Figure 4:
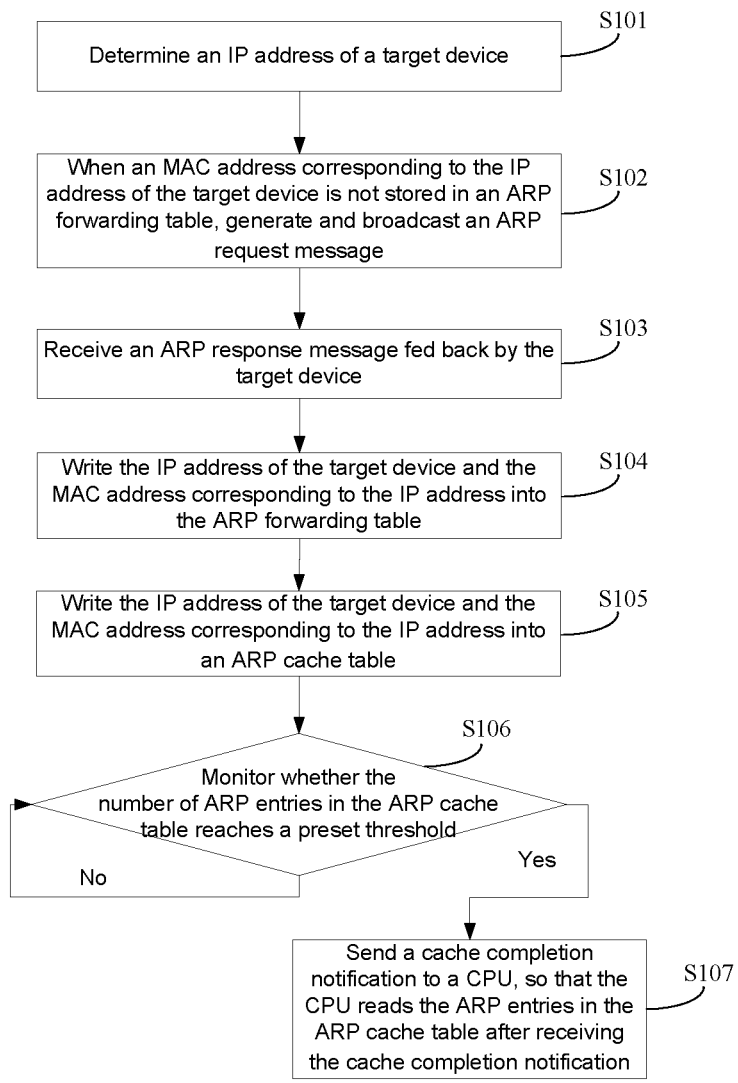
FIG. 4 is a flowchart of a further ARP learning method provided in an embodiment of the present disclosure.

FIG. 4 is a further ARP learning method provided in an embodiment of the present disclosure. As shown in FIG. 4, in some embodiments, before the step S104, the method also includes the following steps.

In step S105, the forwarding chip writes the IP address of the target device and the MAC address corresponding to the IP address into an ARP cache table.

The ARP cache table can be set in the forwarding chip, or can be set outside the forwarding chip and can be directly invoked and changed by the forwarding chip. The ARP cache table is used for caching an ARP entry. The ARP entry refers to a correspondence relationship between an IP address of a node device and an MAC address corresponding to the IP address. A CPU can fast read the ARP entry from the cache table.

In step S106, the forwarding chip monitors whether the number of ARP entries in the ARP cache table reaches a preset threshold.

When it is monitored that the number of ARP entries in the ARP cache table reaches a preset threshold, step S107 is executed.

In step S107, the forwarding chip sends a cache completion notification to the CPU, so that the CPU reads the ARP entries in the ARP cache table after receiving the cache completion notification.

Generally, an ARP database is configured for the CPU. ARP entries are stored in the ARP database. The ARP database is used for being invoked and read by an upper application layer. In the same node device, the ARP entries stored in the ARP database shall be the same as the ARP entries stored in the ARP forwarding table. Therefore, after the ARP entries have been filled in the ARP forwarding table, data in the ARP database needs to be synchronously updated. In the embodiment of the present disclosure, the CPU is used to read the ARP cache table and write the ARP cache table into the ARP database, so that data synchronization between the ARP database and the ARP forwarding table is achieved.

In the embodiment of the present disclosure, the forwarding chip monitors in real time whether the number of ARP entries stored in the ARP cache table reaches a preset threshold; when it is monitored that the number reaches the preset threshold, it indicates that the ARP entries in the ARP cache table can be read; then a cache completion notification is sent to the CPU; After receiving the cache completion notification, the CPU reads the ARP entries in the ARP cache table, packs the ARP entries, and sends the ARP entry packet to an ARP protocol to generate an ARP table; and in addition, after the CPU completes reading the ARP entries, the forwarding chip resets the ARP cache table for rewriting.

In this embodiment, the ARP learning rate can be restrained by means of controlling the preset threshold of the number of ARP entries in the ARP cache table, thus the learning rate of the ARP can be controlled.

As an implementation of the ARP cache table, the ARP cache table may be one cache area allocated in a share internal memory. The cache area is configured with a write pointer. At each time when the forwarding chip writes one ARP entry into the ARP cache table, the write pointer of the cache area is increased by 1. When the write pointer of the cache area is equal to a depth of the cache area, the forwarding chip stops the write operation, and sends a cache completion notification to the CPU. After receiving the cache completion notification, the CPU reads the ARP entries from the cache area, and at the same time, the forwarding chip resets the write pointer.

Figure 5:
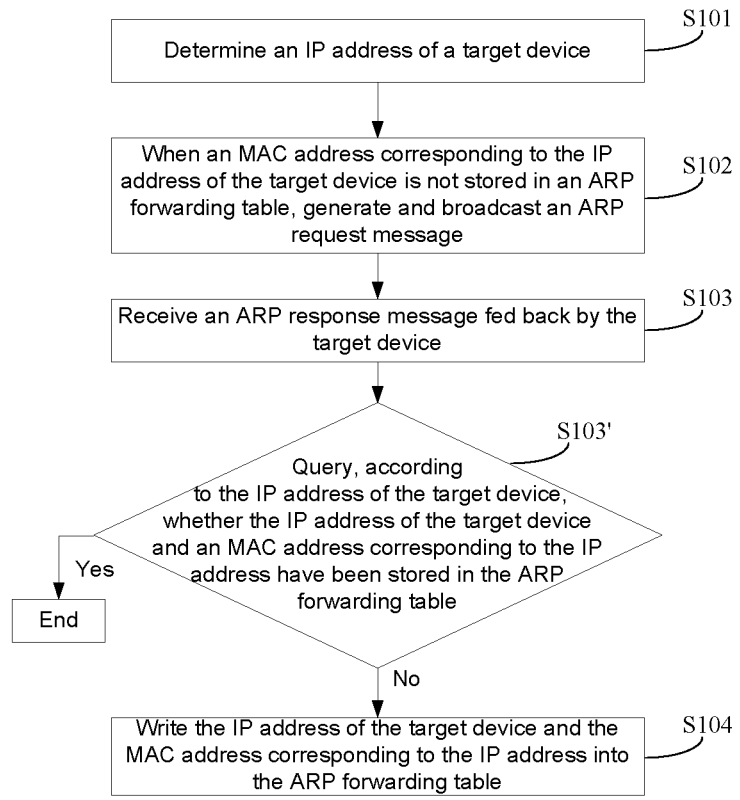
FIG. 5 is a flowchart of a further ARP learning method provided in an embodiment of the present disclosure.

FIG. 5 is an ARP learning method provided in an embodiment of the present disclosure. As shown in FIG. 5, in some embodiments, before the step S104, the method also includes the following steps.

In step S103', the forwarding chip queries, according to the IP address of the target device, whether an MAC address corresponding to the IP address of the target device has been stored in the ARP forwarding table.

When it is queried that no MAC address corresponding to the IP address of the target device is stored in the ARP forwarding table, the step S104 is executed; and when it is queried that an MAC address corresponding to the IP address of the target device has been stored in the ARP forwarding table, the flow of this method ends.

In practical applications, after the forwarding chip broadcasts the ARP request message for the first time, if no ARP response message has been received yet within a preset time period, the forwarding chip will broadcast the ARP request message again until an ARP response message is received. Therefore, the forwarding chip may possibly receive a plurality of ARP response messages subsequently. Furthermore, the plurality of received ARP response messages are all the same. If the ARP response message is written into the ARP forwarding table at each time, this will inevitably cause resource occupation and lead to a decrease in the ARP learning rate. Before writing the ARP response message into the ARP forwarding table at each time (the step S104), the embodiment of the present disclosure queries whether an MAC address corresponding to the IP address of a device that is contained in the ARP response message has been stored in the ARP forwarding table, so that multiple repeated executions of the write operation can be avoided, and a decrease in the ARP learning rate can be avoided.

Figure 6:
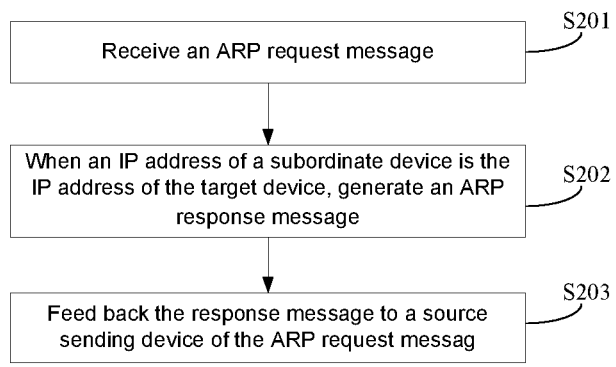
FIG. 6 is a flowchart of a further ARP learning method provided in an embodiment of the present disclosure.

FIG. 6 is a flowchart of a further ARP learning method provided in an embodiment of the present disclosure. As shown in FIG. 6, the method includes the following steps.

In step S201, a forwarding chip receives an ARP request message, wherein the ARP request message includes an IP address of a target device.

In step S202, when an IP address of a device to which the forwarding chip belongs is the IP address of the target device, the forwarding chip generates an ARP response message, wherein the ARP response message includes an MAC address of the device to which the forwarding chip belongs.

In step S203, the forwarding chip feeds back the response message to a source sending device of the ARP request message.

In the embodiment of the present disclosure, the steps S201 to S203 correspond to the steps S103 and S104, so they are specifically refer to the descriptions of the step S103 and the step S104. Descriptions thereof are omitted here.

According to the ARP learning method provided by the embodiment of the present disclosure, when a node device needs to carry out ARP learning, the forwarding chip of the node device directly generates an ARP request message and broadcasts the same. In addition, after receiving an ARP response message, the forwarding chip directly writes the ARP forwarding table, without processing the ARP forwarding table by a CPU, thus avoiding being transmitted upward and downward by the CPU, so that the ARP learning rate is increased, and the probability of data packet loss is reduced. Therefore, the ARP learning method is more applicable to the requirement for 5G bearing.

Figure 7:
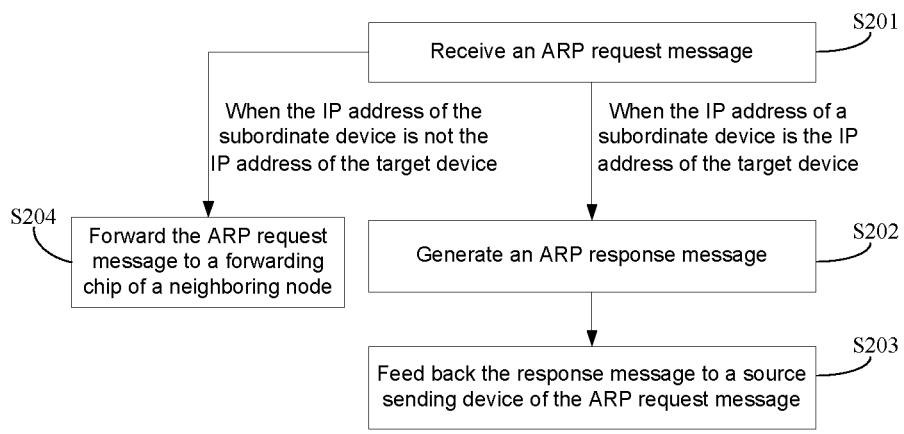
FIG. 7 is a flowchart of a further ARP learning method provided in an embodiment of the present disclosure.

FIG. 7 is a flow chart of a further ARP learning method provided in an embodiment of the present disclosure. As shown in FIG. 7, in some embodiments, when the forwarding chip determines that the IP address of the device to which the forwarding chip belongs is not the IP address of the target device, the following step S204 is executed.

In step S204, the forwarding chip forwards the ARP request message to a forwarding chip of a neighboring node.

In practical applications, when broadcasting the ARP request message, the source sending device only broadcasts the ARP request message to its neighboring node device, instead of broadcasting the ARP message in the entire local area network. After the neighboring node device receives the ARP request message, when it is determined that the IP address of the device to which the forwarding chip belongs is not the IP address of the target device, broadcasting is carried out again, so as to broadcast the ARP request message to its neighboring node device.

Figure 8:
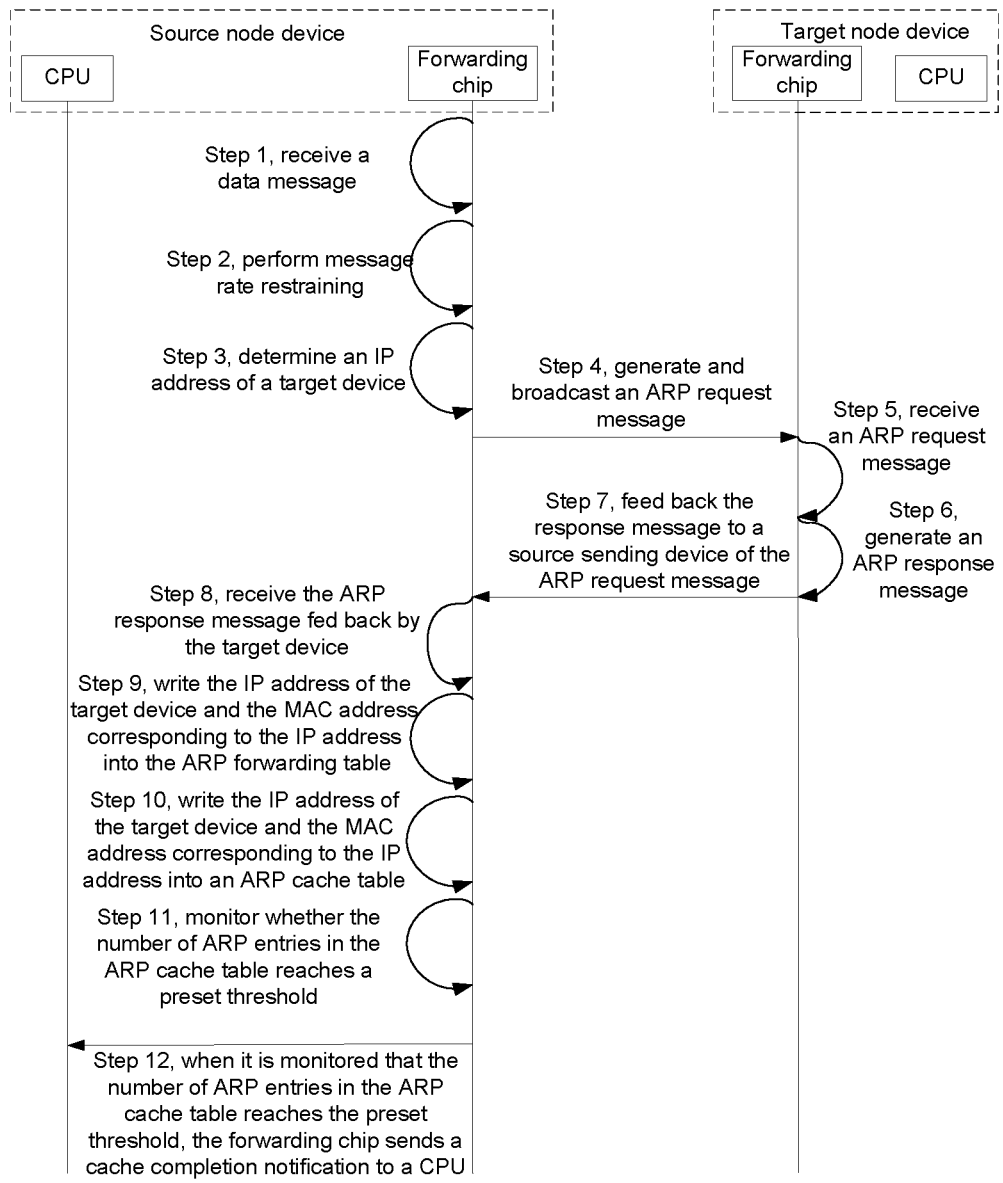
FIG. 8 is a diagram of an interaction process of an ARP learning method provided in an embodiment of the present disclosure.

FIG. 8 is a diagram of an interaction process of an ARP learning method provided in an embodiment of the present disclosure. As shown in FIG. 8, the interaction process involves an upstream node device and a downstream node device, specifically involving forwarding chips in the upstream node device and the downstream node device. The interaction process specifically includes the following steps.

In step 1, a forwarding chip of a source node device receives a data message.

In step 2, the forwarding chip of the source node device performs message rate restraining.

In step 3, the forwarding chip of the source node device determines an IP address of a target device.

In step 4, when an MAC address corresponding to the IP address of the target device is not stored in an ARP the forwarding chip of the source node device generates and broadcasts an ARP request message.

In step 5, the forwarding chip of the target device receives an ARP request message, wherein the ARP request message includes an IP address of a target device.

In step 6, the forwarding chip of the target device generates an ARP response message, wherein the ARP response message includes an MAC address of the device to which the forwarding chip belongs.

In step 7, the forwarding chip of the target device feeds back the response message to a source sending device (a source node device) of the ARP request message.

In step 8, the forwarding chip of the source node device receives the ARP response message fed back by the target device.

In step 9, the forwarding chip of the source node device writes the IP address of the target device and the MAC address corresponding to the IP address into the ARP forwarding table.

In step 10, the forwarding chip of the source node device writes the IP address of the target device and the MAC address corresponding to the IP address into an ARP cache table.

In step 11, the forwarding chip of the source node device monitors whether the number of ARP entries in the ARP cache table reaches a preset threshold.

In step 12, the forwarding chip of the source node device sends a cache completion notification to a CPU, so that the CPU reads the ARP entries in the ARP cache table after receiving the cache completion notification.

The specific descriptions of the all the above steps may refer to the corresponding content in the foregoing embodiments, and will be omitted here.

An embodiment of the present disclosure also provides a forwarding chip, which stores a computer program. The computer program, when executed, enable the forwarding chip to implement the ARP learning methods provided in the embodiments of the present disclosure.

An embodiment of the present disclosure also provides a node device, which includes the CPU and the forwarding chip provided by the above-mentioned embodiments.

In some embodiments, the node device provided in the embodiment of the present disclosure is a device with a routing function, such as a router or a switch.

An embodiment of the present disclosure also provides a computer-readable medium, which stores a computer program. The computer program, when executed by a processor, implements the ARP learning methods provided in the above-mentioned embodiments of the present disclosure.

Those skilled in the art can understand that all or some of the steps in the methods disclosed above and the functional modules/units in the system and the device can be implemented as software, firmware, hardware, and their appropriate combinations. In a hardware implementation mode, the division between the functional modules/units mentioned in the above description does not necessarily correspond to the division of physical components. For example, one physical component may have multiple functions, or one function or step may be executed by the cooperation of several physical components. Some or all physical components may be implemented as software executed by a processor, such as a central processing unit, a digital signal processor or a microprocessor, or as hardware, or as an integrated circuit, such as an disclosure specific integrated circuit. Such software may be distributed on computer-readable media, which may include computer storage media (or non-transitory media) and communication media (or transitory media). As is well known to those of ordinary skill in the art, the term "computer storage medium" includes volatile, nonvolatile, removable, and non-removable media implemented by any method or technology for storing information (such as a computer-readable instruction, a data structure, a program module, or other data). The computer storage media include, but are not limited to, a Random Access Memory (RAM), a Read-Only Memory (ROM), an Electrically Erasable Programmable Read-Only Memory (EEPROM), a flash memory or other memory technologies, a Compact Disc Read-Only Memory (CD-ROM), a Digital Versatile Disc (DVD) or other optical disk storages, a cassette, a tape, a magnetic disk storage or other magnetic storage devices, or any other media that can be used for storing desired information and that can be accessed by a computer. In addition, as is well known to those of ordinary skill in the art, communication media typically embody computer-readable instructions, data structures, computer program modules, or other data in a modulated data signal such as a carrier or other transport mechanisms, and can include any information delivery media.

Example embodiments have been disclosed herein. Although specific terms are employed, they are used and should only be construed in a general descriptive sense and not for purposes of limitation. In some examples, it will be apparent to those skilled in the art that features, characteristics and/or elements described in connection with a particular embodiment may be used alone or in combination with features, characteristics and/or elements described in connection with other embodiments, unless expressly stated otherwise. Therefore, it will be understood by those of ordinary skill in the art that various changes in forms and details may be made without departing from the scope of the present disclosure as set forth in the appended claims.

What is claimed is:

1. An Address Resolution Protocol (ARP) learning method, comprising:
   determining, by a forwarding chip, an IP address of a target device;
   when an MAC address corresponding to the IP address of the target device is not stored in an ARP forwarding table, generating and broadcasting, by the forwarding chip, an ARP request message, wherein the ARP request message comprises the IP address of the target device;
   receiving, by the forwarding chip, an ARP response message fed back by the target device, wherein the ARP response message comprises an MAC address of the target device; and
   writing, by the forwarding chip, the IP address of the target device and the MAC address corresponding to the IP address into an ARP forwarding table.

2. The method according to claim 1, wherein before determining, by the forwarding chip, an IP address of a target device, the method further comprises:
   receiving, by the forwarding chip, a data message, wherein the data message comprises an IP address of a destination device;
   determining, by the forwarding chip, an IP address of a target device, which comprises:
   determining, by the forwarding chip, whether the destination device is a direct routing device of the device to which the forwarding chip belongs;
   when the destination device is a direct routing device of the device to which the forwarding chip belongs, taking, by the forwarding chip, the IP address of the destination device as the IP address of the target device; and
   when the destination device is not a direct routing device of the device to which the forwarding chip belongs, querying, by the forwarding chip, a pre-stored routing table according to the IP address of the destination device, so as to obtain an IP address of a device corresponding to a next-hop node, and taking the obtained IP address of the device corresponding to the next-hop node as the IP address of the target device.

3. A forwarding chip, which stores a computer program, wherein when the computer program, is executed to make the forwarding chip to implement the method as claimed in claim 2.

4. A non-transitory computer-readable medium, which stores a computer program, wherein when the computer program is executed by a processor to implement the method as claimed in claim 2.

5. The method according to claim 1, wherein after writing, by the forwarding chip, the IP address of the target device and the MAC address corresponding to the IP address into the ARP forwarding table, the method further comprises:
   writing, by the forwarding chip, the IP address of the target device and the MAC address corresponding to the IP address into an ARP cache table;
   monitoring, by the forwarding chip, whether the number of ARP entries in the ARP cache table reaches a preset threshold; and
   when the number of ARP entries in the ARP cache table reaches the preset threshold, sending, by the forwarding chip, a cache completion notification to a Central Processing Unit (CPU), so that the CPU reads the ARP entries in the ARP cache table after receiving the cache completion notification.

6. A forwarding chip, which stores a computer program, wherein when the computer program, is executed to make the forwarding chip to implement the method as claimed in claim 5.

7. A non-transitory computer-readable medium, which stores a computer program, wherein when the computer program is executed by a processor to implement the method as claimed in claim 5.

8. The method according to claim 1, wherein before writing, by the forwarding chip, the IP address of the target device and the MAC address corresponding to the IP address into the ARP forwarding table, the method further comprises:
   querying, by the forwarding chip, whether an MAC address corresponding to the IP address of the target device has been stored in the ARP forwarding table according to the IP address of the target device; and
   when no MAC address corresponding to the IP address of the target device is stored in the ARP forwarding table, writing, by the forwarding chip, the IP address of the target device and the MAC address corresponding to the IP address into the ARP forwarding table.

9. A forwarding chip, which stores a computer program, wherein when the computer program, is executed to make the forwarding chip to implement the method as claimed in claim 8.

10. A non-transitory computer-readable medium, which stores a computer program, wherein when the computer program is executed by a processor to implement the method as claimed in claim 8.

11. The method according to claim 1, wherein when an MAC address corresponding to the IP address of the target device is stored in the ARP forwarding table, the forwarding chip sends the data message to the target device according to the MAC address corresponding to the IP address of the target device.

12. A forwarding chip, which stores a computer program, wherein when the computer program, is executed to make the forwarding chip to implement the method as claimed in claim 11.

13. A non-transitory computer-readable medium, which stores a computer program, wherein when the computer program is executed by a processor to implement the method as claimed in claim 11.

14. A non-transitory computer-readable medium, which stores a computer program, wherein when the computer program is executed by a processor to implement the method as claimed claim 1.

15. An ARP learning method, comprising:
   receiving, by a forwarding chip, an ARP request message, wherein the ARP request message comprises an IP address of a target device;
   when an IP address of a device to which the forwarding chip belongs is the IP address of the target device, generating, by the forwarding chip, an ARP response message, wherein the ARP response message comprises an MAC address of the device to which the forwarding chip belongs; and
   feeding back, by the forwarding chip, the response message to a source sending device of the ARP request message.

16. The method according to claim 15, wherein when the IP address of the device to which the forwarding chip belongs is not the IP address of the target device, forwarding, by the forwarding chip, the ARP request message to a forwarding chip of a neighboring node.

17. A forwarding chip, which stores a computer program, wherein when the computer program, is executed to make the forwarding chip to implement the method as claimed in claim 16.

18. A forwarding chip, which stores a computer program, wherein when the computer program, is executed to make the forwarding chip to implement the method as claimed in claim 15.

19. A forwarding chip, which stores a computer program, wherein when the computer program, is executed to make the forwarding chip to implement the method as claimed in claim 1.

20. A node device, comprising the forwarding chip and the CPU as claimed in claim 19.

* * * * *